US012763536B2

(12) United States Patent
Arnault et al.

(10) Patent No.: US 12,763,536 B2
(45) Date of Patent: Oct. 13, 2026

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR)

(73) Assignee: AKTIEBOLAGET SKF, Gothenburg (SE)

( * ) Notice: Subject to any disclaimer, the term of this patent is extended or adjusted under 35 U.S.C. 154(b) by 206 days.

(21) Appl. No.: 18/607,710

(22) Filed: Mar. 18, 2024

(65) Prior Publication Data

US 2024/0322509 A1 Sep. 26, 2024

(30) Foreign Application Priority Data

Mar. 24, 2023 (FR) ....................................... 2302819

(51) Int. Cl.

| | |
|---|---|
| ***H01R 39/24*** | (2006.01) |
| ***H01R 4/64*** | (2006.01) |
| ***H01R 39/38*** | (2006.01) |
| ***H01R 39/39*** | (2006.01) |
| ***H01R 39/64*** | (2006.01) |

(Continued)

(52) U.S. Cl.

CPC ............... *H01R 39/24* (2013.01); *H01R 4/64* (2013.01); *H01R 39/385* (2013.01); *H01R 39/39* (2013.01); *H01R 39/64* (2013.01); *H02K 11/40* (2016.01); *H05F 3/02* (2013.01); *H01R 2201/10* (2013.01)

(58) Field of Classification Search

CPC .. C12N 15/635; C12Q 1/6804; C12Q 1/6869; C12Q 1/6886; C12Q 2600/136; C12Q 2600/158; F16C 19/52; F16C 2380/26; F16C 41/002; H01R 2201/10;

(Continued)

(56) References Cited

U.S. PATENT DOCUMENTS

| | | | |
|---|---|---|---|
| 2017/0353087 A1 | 12/2017 | Magno Dos Santos et al. | |
| 2021/0021180 A1 | 1/2021 | Hubert et al. | |

(Continued)

FOREIGN PATENT DOCUMENTS

| | | | |
|---|---|---|---|
| CN | 213576191 U | 6/2021 | |
| DE | 102019202844 A1 * | 9/2019 | ............. H01R 39/24 |

(Continued)

OTHER PUBLICATIONS

Preliminary Search Report from the French Patent Office dated Oct. 26, 2023 in related French application No. FR2302819, including Search Report and Written Opinion.

*Primary Examiner* — Christopher M Koehler
*Assistant Examiner* — Ethan Nguyen Vo
(74) *Attorney, Agent, or Firm* — J-TEK LAW PLLC; Scott T. Wakeman; Mark A Ussai

(57) ABSTRACT

A grounding brush assembly includes a grounding brush having a support and a plurality of conductive fibers fitted inside the support. A brush fitting plate is connected with the support of the brush and includes a plurality of retention tongues configured to retain the support of the brush, a radial portion, an annular flange extending from the radial portion and spaced radially outwardly from the retention tongues. The fitting plate also includes a plurality of through-openings, which each extend through the radial portion and through the flange, and at least one local deformation formed on the flange of the fitting plate and extending radially inwardly.

10 Claims, 11 Drawing Sheets

(51) Int. Cl.
*H02K 11/40* (2016.01)
*H05F 3/02* (2006.01)

(58) Field of Classification Search
CPC ...... H01R 39/24; H01R 39/385; H01R 39/39; H01R 39/64; H01R 4/64; H02K 11/40; H05F 3/02
See application file for complete search history.

(56) References Cited

U.S. PATENT DOCUMENTS

| | | | | |
|---|---|---|---|---|
| 2021/0364040 | A1* | 11/2021 | Arnault ................. | F16C 41/002 |
| 2021/0364041 | A1 | 11/2021 | Berruet et al. | |
| 2022/0294319 | A1 | 9/2022 | Arnault et al. | |
| 2023/0013562 | A1 | 1/2023 | Schamin et al. | |
| 2024/0280144 | A1* | 8/2024 | Giehl .................... | F16C 33/583 |
| 2024/0283206 | A1 | 8/2024 | Arnault et al. | |
| 2024/0322508 | A1 | 9/2024 | Arnault et al. | |

FOREIGN PATENT DOCUMENTS

| | | | |
|---|---|---|---|
| DE | 102021114965 | A1 | 12/2022 |
| DE | 102021207724 | A1 | 1/2023 |
| FR | 3120754 | A1 | 9/2022 |
| GB | 2160370 | A | 12/1985 |

* cited by examiner

GROUNDING BRUSH ASSEMBLY

CROSS-REFERENCE

This application claims priority to French patent application no. 2302819 filed on Mar. 24, 2023, the contents of which are fully incorporated herein by reference.

BACKGROUND OF THE INVENTION

The present invention relates to grounding devices for controlling shaft current generated in motors or electrical machines, and more particularly to grounding brush assemblies.

In a motor or electrical machine, at least one roller bearing is fitted between the housing of the motor or electrical machine and a rotary shaft so as to rotatably support the shaft. During motor operation as the shaft rotates, a difference of electrical potential may be arise between the shaft and the housing of the motor or other electrical machine, which can generate a flow of electric current between the inner ring of the roller bearing, connected with the shaft, and the outer ring connected with the housing. Such electric current passing through the components of the roller bearing can damage these components, in particular the rolling elements and the raceways provided on the inner and outer rings. The electrical discharges can also generate vibrations.

In order to eliminate these disadvantages, it is known to "earth" or ground the rotary shaft by using a brush or a grounding brush comprising conductive fibers. The grounding brush is generally fitted in the bore of the housing of the electric motor, such that the free ends of the fibers are in radial contact with the outer surface of the rotary shaft.

Due to the conductivity of the fibers, the brush is maintained at the same electrical potential as the housing of the electric motor. The inner and outer rings of the roller bearing are also at the same electrical potential, which reduces or even eliminates the problematic electrical discharges through the roller bearing.

Such a grounding brush assembly is disclosed in US Patent Publication No. 2021/0021180 A1, which includes a grounding brush provided with a plurality of conductive fibers, a support inside of which the conductive fibers are fitted, and an annular fitting plate. The fitting plate includes a plurality of tongues for radial and axial retention of the support and an annular outer flange surrounding the brush and the tongues radially. These tongues are formed by cutting and plastic deformations of the radial portion of the fitting plate, which is axially supported against the support.

Generally, to install the brush assembly inside the bore of the housing of the electric motor, a cylindrical tool is used. Such a tool is inserted radially between the support of the brush and the outer flange of the fitting plate and is supported axially against the radial portion of the fitting plate.

For an electric motor with a relatively small radial space between the housing and the rotary shaft, it is often not possible to place the tool between the support and the flange for installation of the brush assembly. This is due to the reduced radial distance between the flange of the fitting plate and the support and the retention tongues of the fitting plate.

Further, it is often not possible to support the tool against the free end of the outer flange of the fitting plate as the thickness of the flange is also often reduced due to the radial compactness between the housing and the rotary shaft. Also, it is generally not advisable to push the fitting tool against the end of the retention tongues of the fitting plate of the brush assembly as such exertion could lead to deformation of the support and the conductive fibers of the brush.

In view of the above, there is a clear need for a grounding brush assembly designed for electric motors in which the radial space between the housing and the rotary shaft is limited.

SUMMARY OF THE INVENTION

The present invention concerns a grounding brush assembly comprising a grounding brush provided with a plurality of conductive fibers and a support inside of which the conductive fibers are fitted. The assembly also comprises a brush fitting plate which is connected with the support of the brush.

The fitting plate includes a plurality of retention tongues configured to retain the support of the brush, a radial portion and an annular flange extending from the radial portion. The annular flange is offset radially outwardly from the retention tongues, i.e., offset towards the exterior relative to the retention tongues, and has an outer surface defining the outer diameter of the fitting plate.

According to a general characteristic, the fitting plate includes a plurality of through-openings which each extend through the radial portion and through the flange.

According to another general characteristic, at least one local deformation is formed on the fitting flange and extends radially inwardly from a remainder of the flange and towards the interior of the assembly.

The one or more deformations provide an increase in the local contact surface of the fitting plate for the tool used during the fitting of the brush assembly inside the bore of the housing of the electric motor.

The deformation(s) thereby limit the risk of deformation of the flange and the fitting plate during installation of the grounding brush assembly. In addition, the axial force applied to the fitting plate is applied in an area spaced from the support and the conductive fibers. The support and the conductive fibers are therefore not deformed during the fitting or installation process.

With the present solution, it is possible to provide a grounding brush assembly with a radially reduced size.

In addition, the local deformation of the fitting plate can also fulfill an anti-rotation function for the assembly. Specifically, a protuberance with a corresponding form may be provided on the bore of the housing of the associated electric motor for interacting with the deformation(s).

Preferably, the at least one local deformation is located circumferentially between two through-openings of the fitting plate. Such positioning of the deformation(s) facilitates the fabrication of the fitting plate.

According to one embodiment, the one or more local deformations each extends from the free end of the flange of the fitting plate. The local deformation may be formed on a part or portion of a length, i.e., an axial length, of the flange of the fitting plate.

Alternatively, each local deformation may be formed along the entire axial length of the flange of the fitting plate. Such elongated deformations reinforce the rigidity of the flange.

According to an alternative embodiment, the local deformation may be axially spaced from the free end of the flange of the fitting plate.

According to one embodiment, a plurality of local deformations are each formed on the flange of the fitting plate, each local deformation extending radially towards the interior, or radially inwardly, and are offset relative to one another in the circumferential direction, i.e., spaced circumferentially apart.

According to one embodiment, the retention tongues for retention of the fitting plate extend from the radial portion. Alternatively, the retention tongues may extend from another portion of the fitting plate.

According to one embodiment, the support and the fitting plate are two distinct parts connected together by the retention tongues. Alternatively, the support and the fitting plate can be produced in a single piece or integrally formed.

According to one embodiment, the radial portion of the fitting plate is supported axially against the support of the brush. Alternatively, another radial portion of the fitting plate may be supported axially against the support of the brush.

The present invention also relates to an electric motor comprising a housing, a shaft and at least one grounding brush assembly as previously defined and fitted radially between the housing and the shaft, the conductive fibers of the brush of the assembly being in contact with the shaft.

BRIEF DESCRIPTION OF THE SEVERAL VIEWS OF THE DRAWINGS

The present invention will be better understood by studying the detailed description of an embodiment, taken by way of non-limiting example, and illustrated by the appended drawings in which.

DETAILED DESCRIPTION OF THE INVENTION

Figure 1:
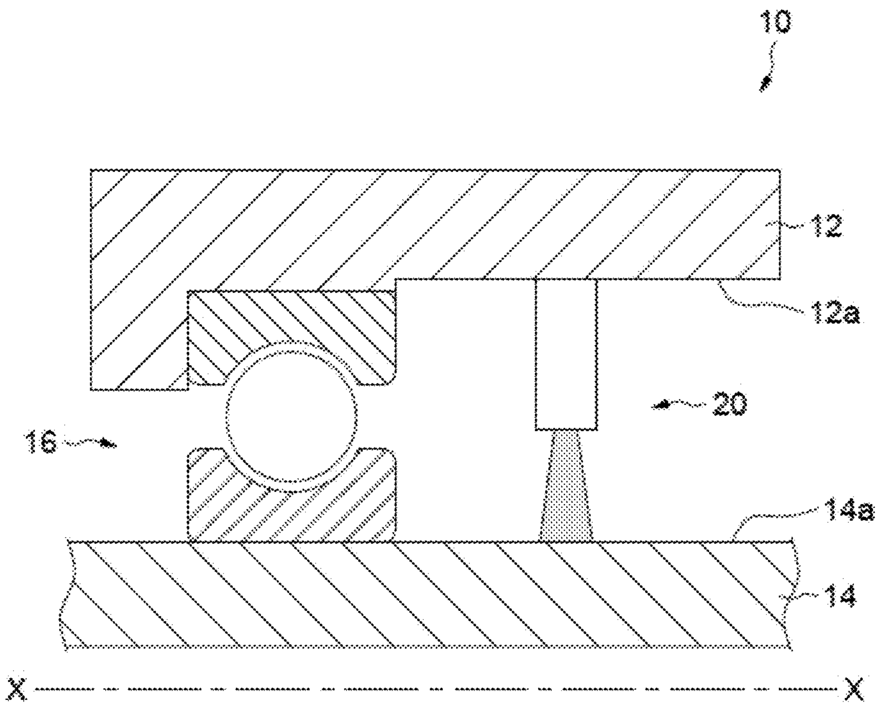
FIG. 1 is an axial cross-sectional view of a grounding brush assembly fitted radially between a rotary shaft and an electric motor housing.

FIG. 1 diagrammatically depicts or represents in axial cross-section a part of a motor 10 or an electrical machine comprising a fixed housing 12 and a rotary shaft 14 rotatable about an axis X-X, which is supported radially by a roller bearing 16. As depicted, the roller bearing 16 is a ball bearing, but may have any other type of rolling elements, such as cylindrical rollers, tapered rollers, needles, etc., or may even be formed as a plain bearing.

The motor 10 also comprises a grounding brush assembly 20 which is fitted radially between the bore 12*a* of the housing 12 and the cylindrical outer surface 14*a* of the rotary shaft 14. The grounding brush assembly 20 enables a continual dissipation of the electrical charges, which accumulate on the shaft 14 of the motor 10 during the motor operation, by transferring these charges to the housing 12.

With reference to FIGS. 2-5, a description will now be provided of a grounding brush assembly 20 according to a first embodiment. The grounding brush assembly 20 has a generally annular form and basically comprises a grounding brush 30 and a brush fitting plate 40 which is configured to retain the brush 30 both axially and radially.

The brush 30 includes a plurality of individual conductive fibers 31, which are designed to be placed or distributed circumferentially around the rotary shaft 14 of the motor 10. The conductive fibers 31 may be formed of carbon, stainless steel or a conductive plastic, such as acrylic or nylon fibers.

The brush 30 also comprises a unit 32 for retention or support, hereinafter referred to as a “support” 32, inside of which the conductive fibers 31 are fitted or disposed. In the illustrated embodiment, the support 32 is in the form of an open ring. The support 32 can be made or fabricated by cutting and stamping. The support 32 is preferably made of an electrically conductive material, such as for example, aluminum, stainless steel, bronze, copper, a conductive plastic or another appropriate conductive material. Alternatively, the support 32 may be made of a non-electrically conductive material provided with a conductive coating or conductive paint.

Figure 5:
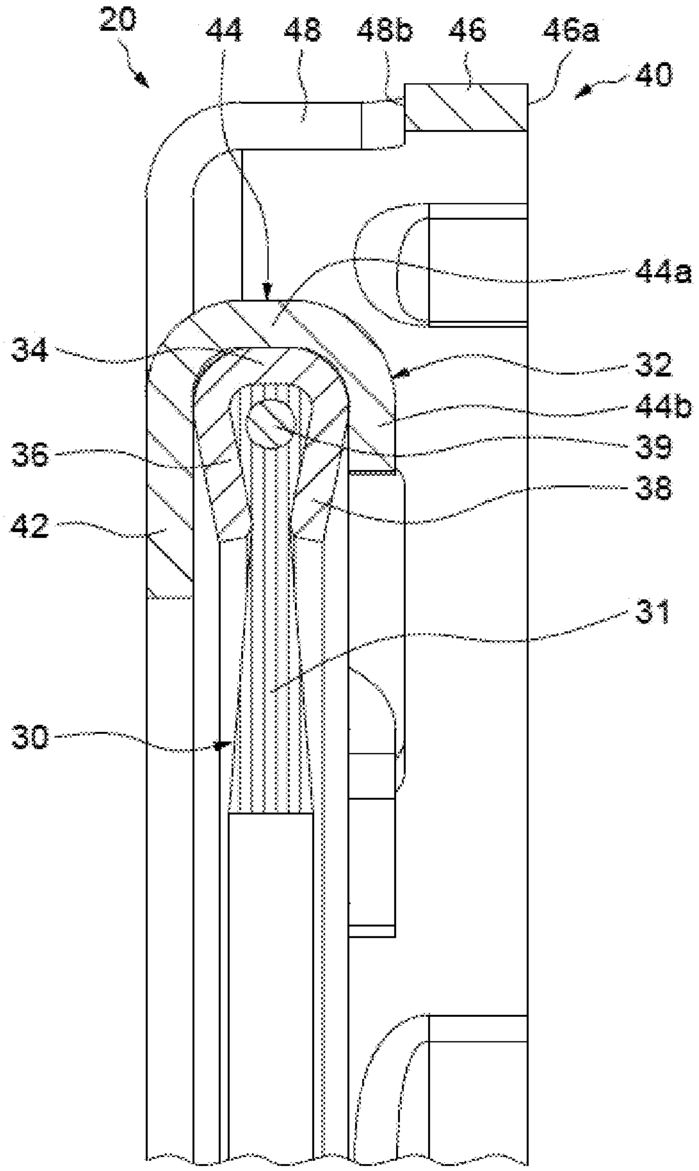
FIG. 5 is a cross-sectional view along the line V-V of FIG. 4.

As illustrated more clearly in FIG. 5, the support 32 includes an axial fitting portion 34 and two opposite lateral flanks 36, 38 each extending radially inwardly from the fitting portion 34 towards the interior, the lateral flanks 36, 38 axially enclosing the conductive fibers 31. As such, the conductive fibers 31 are supported axially on both sides against the lateral flanks 36, 38.

The fitting portion 34 and the two lateral flanks 36, 38 delimit a channel (not indicated) which is open radially on an inner side, the conductive fibers 31 being partly situated or disposed within the channel.

In the illustrated example, the conductive fibers 31 are folded or bent around a connection wire 39 of the support 32. The distal free end(s) of each conductive fiber 31 is designed to come into radial contact with the outer surface 14*a* of the rotary shaft 14 of the motor 10. The proximal end of each conductive fiber 31 is in radial contact with the fitting portion 34 of the support 32.

The lateral flank 36 extends radially inwardly from one axial end of the fitting portion 34 and the lateral flank 38 extends radially inwardly from the opposite axial end of the fitting portion 34. Preferably, the lateral flanks 36, 38 extend obliquely towards the interior from the fitting portion 34 and are preferably symmetrical with respect to each other relative to a median radial plane of the support 32. As depicted, the fitting portion 34 extends axially, but may alternatively extend obliquely. Also, the lateral flanks 36, 38 may alternatively be asymmetrical.

Figure 2:
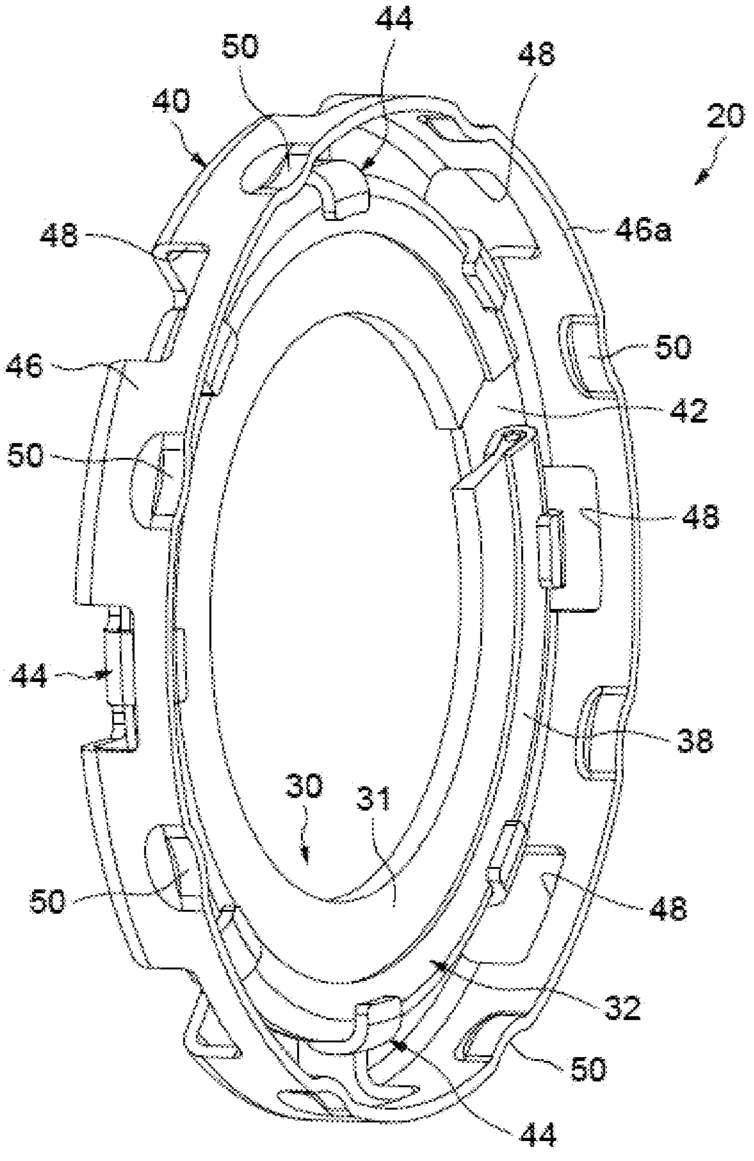
FIG. 2 is a front perspective view of the grounding brush assembly according to a first embodiment of the present invention.
Figure 3:
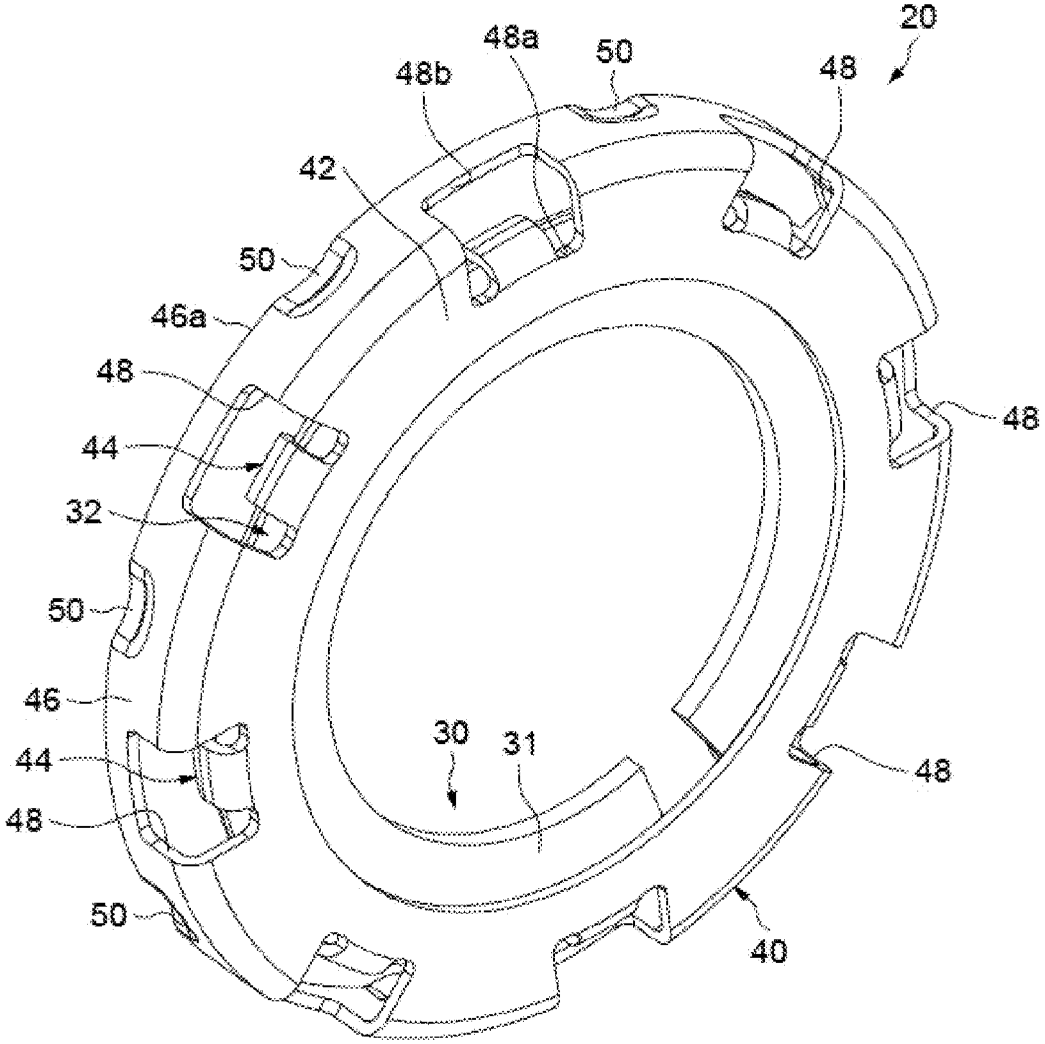
FIG. 3 is a rear perspective view of the grounding brush assembly according to the first embodiment of the present invention.
Figure 4:
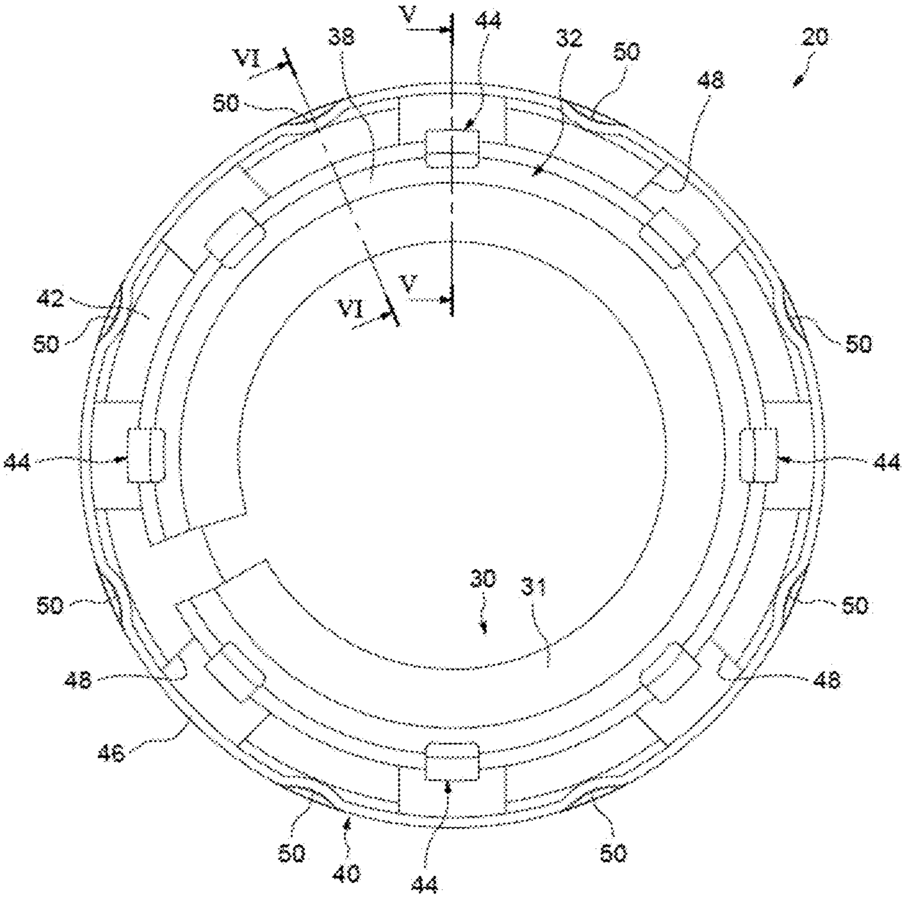
FIG. 4 is a front plan view of the grounding brush assembly of FIGS. 2 and 3.

The brush 30 is preferably in the form of an open ring comprising a first end which is spaced circumferentially from a second end facing the first end, as shown in FIGS. 2-4. Such circumferential spacing between the two ends of the brush 30 allows the brush 30 to adapt to different diameters of the motor shaft 14.

In general, the first and second circumferential ends of the brush 30 are not secured to one another, but may be in contact with one another. Alternatively, the first end and the second end of the brush 30 may be secured to each other.

The fitting plate 40 of the brush assembly 20 includes an annular radial portion 42 and a plurality of retention tongues 44 configured to axially and radially retain the brush 30, the tongues 44 extending from the radial portion 42. As will be described in greater detail below, the fitting plate 40 also includes an annular flange 46 extending from the radial portion 42.

The fitting plate 40 is preferably fabricated by cutting and stamping and is preferably formed of a conductive material, such as for example, aluminum, stainless steel, bronze, copper or another appropriate conductive material. Alternatively, the fitting plate 40 may be formed of a non-electrically conductive material and provided with a conductive coating or a conductive paint.

The radial portion 42 of the fitting plate 40 is supported axially against the support 32 of the brush 30. More specifically, the radial portion 42 is supported axially against the lateral flank 36 of the support 32.

The retention tongues 44 are spaced from one another in the circumferential direction, i.e., are circumferentially spaced apart, preferably regularly or evenly. Alternatively, the tongues 44 may be circumferentially spaced irregularly or staggered. In the illustrated embodiment, there are eight tongues 44, but there may alternatively be a greater or lesser number of tongues 44. Further, it is possible to provide only two tongues 44 or at least four tongues 44. Preferably, the number of tongues 44 is at least equal to two.

Each retention tongue 44 extends axially projecting relative to the radial portion 42. Each tongue 44 locally radially surrounds the support 32 of the brush 30 and is in radial contact with the fitting portion 34 of the support 32. The support 32 is maintained supported axially against the radial portion 42 of the fitting plate 40 by the tongues 44. The tongues 44 enable the axial and radial retention of the grounding brush 30. The lateral flank 36 of the support 32 is supported against the radial portion 42 of the fitting plate 40 and the lateral flank 38 is supported against the tongues 44. Preferably, the tongues 44 are formed substantially identical to each other.

Further, each retention tongue 44 includes an axial portion **44*a*, which extends axially from the radial portion 42 and locally radially surrounds and contacts the support 32, and a radial portion 44*b*. Each radial portion 44*b* is provided at a free end of the axial portion 44*a* and is folded back or bent radially inwardly toward the interior. The folded-back or radial portion 44*b* of each tongue 44 enables the axial retention of the support 32 of the grounding brush 30. The folded-back/radial portion 44*b* of each tongue 44 is in axial contact against the lateral flank 38 of the support 32**.

The annular flange 46 of the fitting plate 40 extends axially from a large diameter or outer edge of the radial portion 42. Preferably, the flange 46 extends axially from the same side of the radial portion 42 as the tongues 44. Alternatively, the flange 46 may extend axially from a side of the radial portion 42 opposite from the tongues 44.

The flange 46 locally radially surrounds and is spaced radially outwardly from the tongues 44. In other words, the bore of the flange 46 is spaced radially apart from the tongues 44. The outer surface of the flange 46, radially opposite the bore of the flange 46, defines the outer diameter of the fitting plate 40. The flange 46 assures the centering of the fitting plate 40 after fitting the brush assembly 20 in the bore **12*a* of the housing 12 of the associated electric motor 10**.

A plurality of through openings 48 are provided in the thickness of the radial portion 42 of the fitting plate 40. The openings 42 also extend axially on the flange 46. In other words, each through opening 48 extends both through the radial portion 42 and through the flange 46. The openings 48 extend locally through the thickness of the radial portion 42 and locally through the thickness of the flange 46. The openings 48 extend axially on the flange 46 and are spaced from the free end **46*a* of the flange 46**.

The openings 48 are formed during the partial cutting of the fitting plate 40 to form the tongues 44. That is, the tongues 44 are formed by cutting, folding and crimping of the fitting plate 40. The openings 48 are circumferentially spaced apart or spaced from each other in the circumferential direction, preferably regularly or evenly. Each tongue 44 is aligned in the circumferential direction with, i.e., circumferentially aligned with, the associated opening 48. The number of openings 48 corresponds to the number of tongues 44.

As can be seen in particular in FIG. 3, the root of each tongue 44 extends from an edge **48*a* of the associated opening 48, which is situated on the radial portion 42**, and extends in the circumferential direction.

The fitting plate 40 also includes a plurality of local deformations 50, which are formed on the flange 46, and extend radially inwardly toward the interior of the brush assembly 20. Each local deformation 50 is located or positioned circumferentially between two immediately successive openings 48.

Each local deformation 50 extends radially towards the interior, i.e., radially inwardly, from the outer surface of the flange 46. Each local deformation 50 is formed by local forcing back or deforming of the material of the flange 46 radially inwardly or toward the interior of the fitting plate 40. Each local deformation 50 forms on the flange 46 a depression or hollow which is oriented radially outwardly or towards the exterior. The local deformations 50 do not open radially onto the bore of the flange 46. Each local deformation 50 projects inwardly toward the interior relative to the remainder of the flange 46 which is not deformed.

In the illustrated embodiment, each local deformation 50 extends axially from the free end **46*a* of the flange 46. Each local deformation 50 preferably extends axially along a portion of the axial length of the flange 46. As such, each local deformation 50 is axially spaced from the radial portion 42. Each deformation 50 extends axially beyond an edge 48*b* of the opening 48 which is situated on the flange 46**, and extends in the circumferential direction.

In the depicted examples, the local deformations 50 are substantially identical to each other. The local deformations 50 are circumferentially spaced apart or spaced from one another in the circumferential direction, in this case regularly or evenly. Alternatively, the deformations 50 may be irregularly or unevenly circumferentially spaced. In the illustrated embodiment, there are eight deformations 50. Alternatively, there may be a greater or lesser number of deformations 50. It is possible to provide only a single deformation 50, at least two deformations 50 located diametrically opposite, at least four deformations 50, etc.

Figure 6:
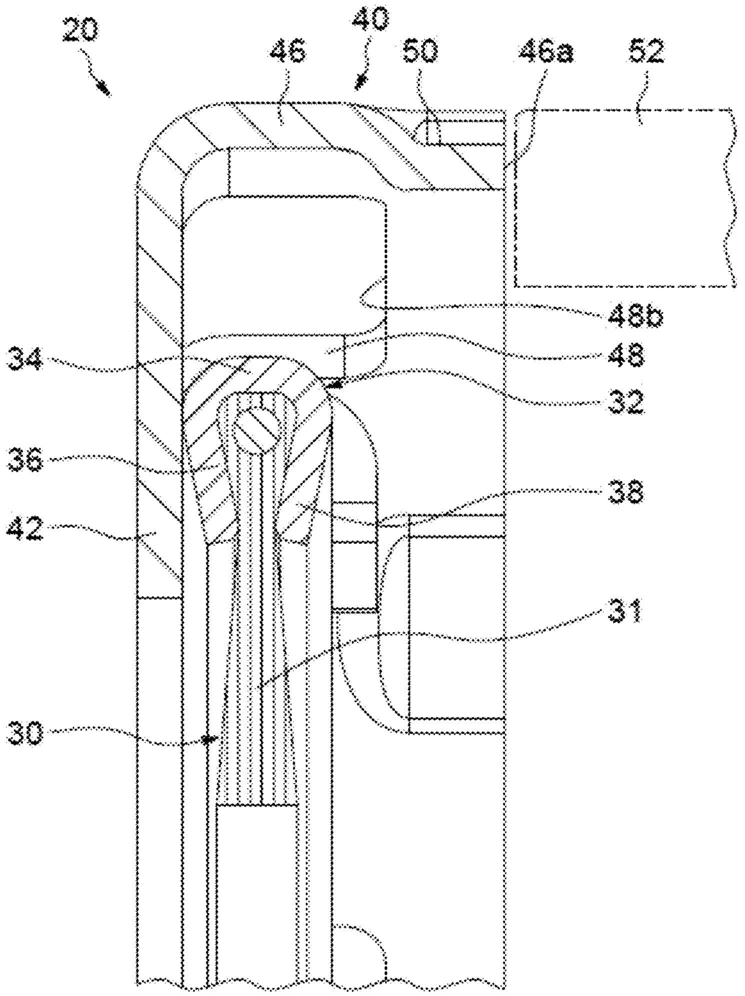
FIG. 6 is a broken-away axial cross-sectional view along the line VI-VI of FIG. 4.

In order to fit or install the grounding brush assembly 20 inside the bore **12*a* of the housing 12 of the associated electric motor 10, a cylindrical fitting tool 52 is preferably used, represented partly in broken lines in FIG. 6, which is positioned so as to be supported axially against the free end 46*a* of the flange 46, in order to be able to thrust or push the brush assembly 20** axially.

The local deformations 50 increase the contact surfaces between the flange 46 of the fitting plate 40 and the tool 52, which facilitates fitting or installation of the brush assembly 20 within the housing 12 of the associated electric motor 10, and without deformation of the support 32 and the conductive fibers 31.

Figure 7:
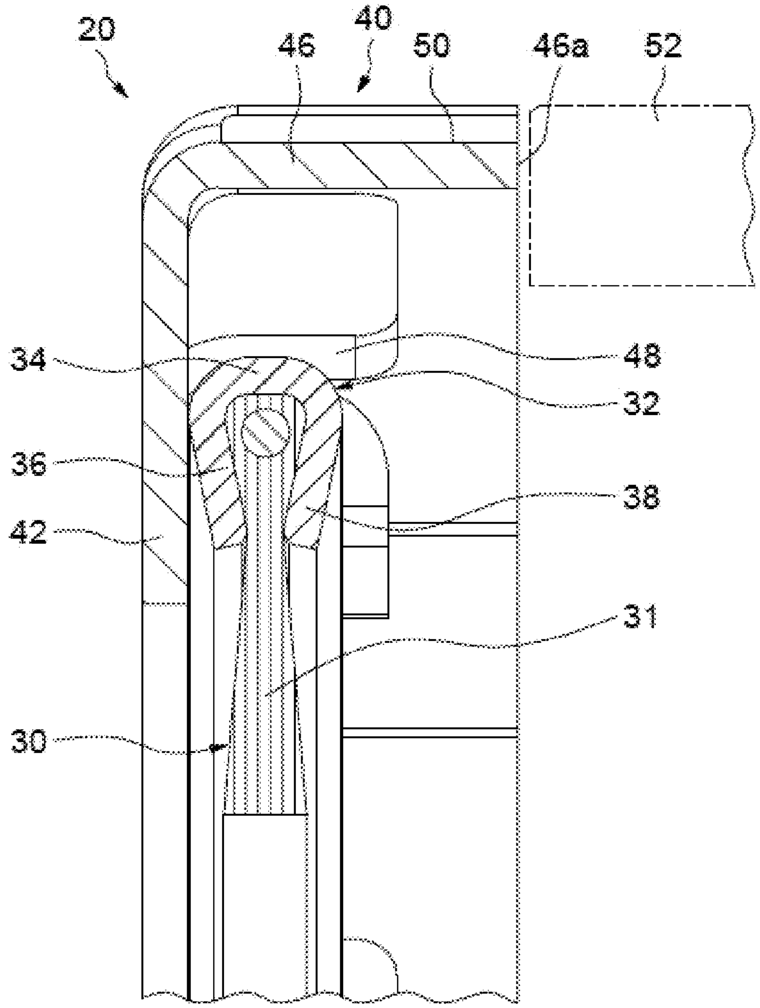
FIG. 7 is an a broken-away, axial cross-sectional view of a grounding brush assembly according to a second embodiment of the invention.
Figure 8:
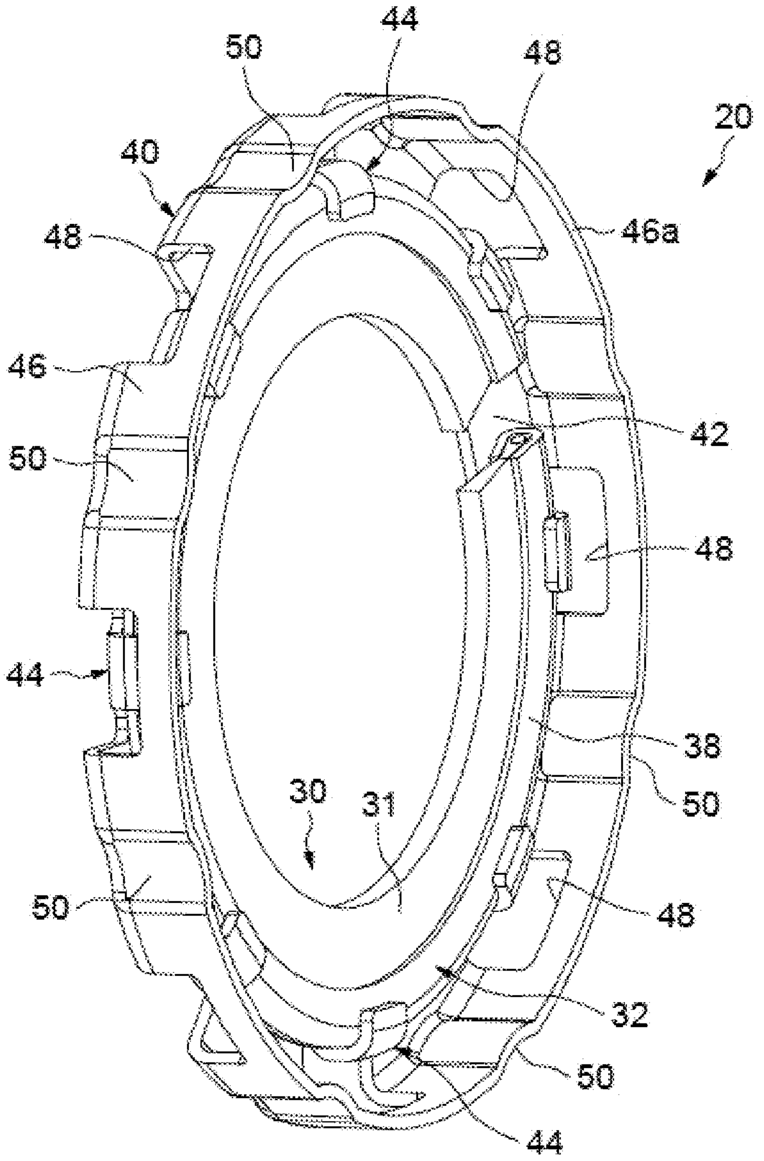
FIG. 8 is a perspective view of the grounding brush assembly of FIG. 7.

The embodiment illustrated in FIGS. 7 and 8, in which elements that are identical are indicated by the same reference numbers, differs from the first depicted example in that the local deformations 50 of the fitting plate 40 extend axially along the entire axial length of the flange 46. The local deformations 50 extend from the free end 46*a* of the flange 46 as far as the radial portion 42.

Figure 9:
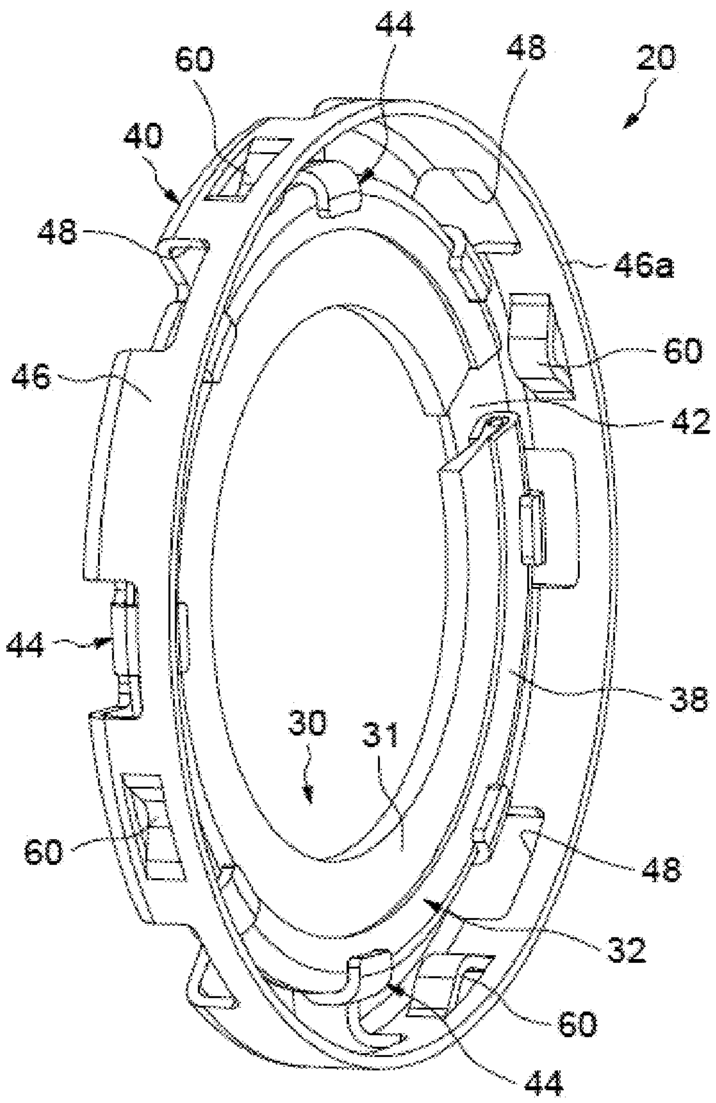
FIG. 9 is a perspective view of a grounding brush assembly according to a third embodiment of the invention.
Figure 10:
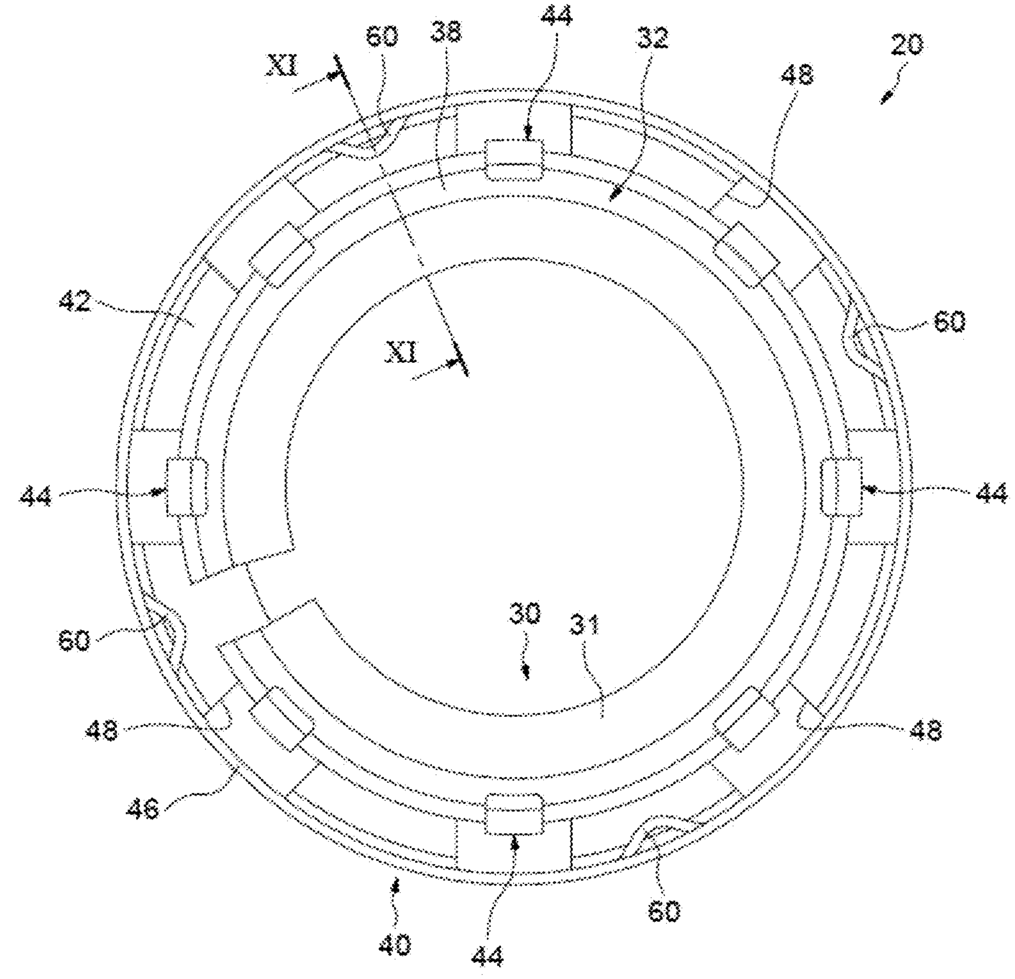
FIG. 10 is a front plan view of the grounding brush assembly of FIG. 9.
Figure 11:
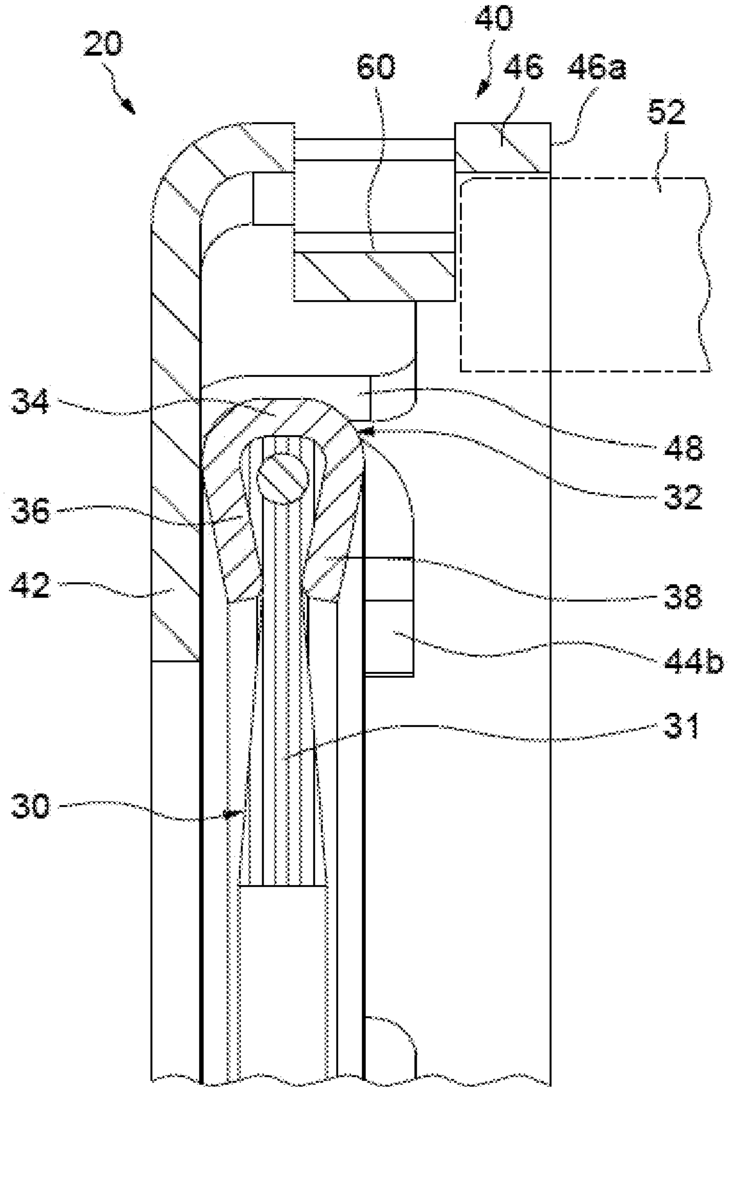
FIG. 11 is a cross-sectional view along the line XI-XI of FIG. 10.

In the first two illustrated embodiments, the local deformations 50 of the fitting plate 40 extend from the free end 46*a* of the flange 46. Alternatively, the local deformations 50 of the fitting plate 40 may be spaced axially from the free end 46*a* of the flange 46, as in the embodiment illustrated in FIGS. 9-11, in which identical elements bear the same reference numbers.

Similarly to the first examples, the local deformations 60 are formed on the flange 46 so as to extend radially inwardly or toward the interior, and do not open radially onto the bore of the flange 46. In this embodiment, the deformations 60 are open on both axial sides. Alternatively, depending on the radial dimension of the deformations 60, the deformations may be closed on one or both of the axial sides of the deformation 60.

Similarly to the first examples, each local deformation 60 extends radially inwardly toward the interior from the outer surface of the flange 46. Each local deformation 60 is formed by local forcing back or deforming of the material of the flange 46, radially inwardly toward the interior. Each local deformation 60 forms a depression or hollow on the flange 46 that is oriented radially towards the exterior, i.e., faces radially outwardly. Each local deformation 60 projects radially inwardly toward the interior relative to the remainder of the flange 46 which is not deformed.

The local deformations 60 are formed on the flange 46 and are axially spaced from both the free end 46*a* of the flange 46 and from the radial portion 42. Each local deformation 60 is situated or positioned circumferentially between two immediately successive openings 48. In the depicted embodiment, the local deformations 60 are substantially identical to each other. Further, the local deformations 60 are circumferentially spaced apart, preferably regularly or evenly. Alternatively, the deformations 60 may be irregularly or unevenly circumferentially spaced apart. In the illustrated embodiment, there are four deformations 60. Alternatively, it is possible to provide a different number of deformations 60.

In order to install or fit the grounding brush assembly 20 inside of the bore 12*a* of the housing 12 of the associated electric motor 10, the tool 52 is positioned against or supported axially on the deformations 60 of the fitting plate 40 so as to thrust or push the assembly 20 axially.

In the embodiments described, the fitting plate 40 is produced by cutting and stamping, and the local deformations 50, 60 are formed by local forcing back or deforming of the material of the flange 46.

Alternatively, the fitting plate 40 may be fabricated by means of other production processes, for example additive production, i.e., by any production process which is based on the construction of the fitting plate layer by layer by addition of material. In this case, the local deformations are obtained during the production of the fitting plate 40. Further for example, the fitting plate 40 may be formed by casting, forging or molding, in which the local deformations 50, 60 are formed along with the remainder of the fitting plate 40.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers fitted inside the support; and a brush fitting plate connected with the support of the brush and including a plurality of retention tongues configured to retain the support, a radial portion, an annular flange extending from the radial portion and offset radially outwardly from and axially overlapping the plurality of retention tongues, the annular flange having an outer surface defining the outer diameter of the fitting plate and centering the fitting plate within a bore of a housing, a plurality of through-openings which each extend through the radial portion and through the flange, and at least one local deformation formed on the flange, extending radially inwardly and being engageable by a tool to push the grounding brush axially during installation within the bore of the housing.

2. The assembly according to claim 1, wherein the at least one local deformation is disposed circumferentially between two of the plurality of through-openings of the fitting plate.

3. The assembly according to claim 1, wherein the at least one local deformation extends axially from the free end of the flange of the fitting plate.

4. The assembly according to claim 1, wherein the at least one local deformation is formed on a portion of an axial length of the flange of the fitting plate.

5. The assembly according to claim 1, wherein the at least one local deformation is formed on an entire axial length of the flange of the fitting plate.

6. The assembly according to claim 1, wherein the at least one local deformation is axially spaced from a free end of the flange of the fitting plate.

7. The assembly according to claim 1, wherein the at least one local deformation includes a plurality of local deformations formed on the flange of the fitting plate, each one of the plurality of local deformations extending radially inwardly and the plurality of local deformations being circumferentially spaced apart.

8. The assembly according to claim 1, wherein the plurality of retention tongues of the fitting plate extend from the radial portion of the fitting plate.

9. The assembly according to claim 1, wherein the radial portion of the fitting plate is supported axially against the support of the brush.

10. An electric motor comprising:

a housing;

a shaft; and at least one grounding brush assembly according to claim 1 fitted radially between the housing and the shaft, the conductive fibers of the brush of the grounding brush assembly being in contact with the shaft.

* * * * *